United States Patent
Harnesk

(10) Patent No.: US 10,696,489 B2
(45) Date of Patent: Jun. 30, 2020

(54) BALANCING LOAD AMONG OPERATIONAL SYSTEM ZONES

(71) Applicant: Packsize LLC, Salt Lake City, UT (US)

(72) Inventor: Andreas Harnesk, Sundbyberg (SE)

(73) Assignee: Packsize LLC, SLC, UT (US)

( * ) Notice: Subject to any disclaimer, the term of this patent is extended or adjusted under 35 U.S.C. 154(b) by 27 days.

(21) Appl. No.: 15/825,463

(22) Filed: Nov. 29, 2017

(65) Prior Publication Data

US 2018/0155133 A1 Jun. 7, 2018

Related U.S. Application Data

(60) Provisional application No. 62/428,872, filed on Dec. 1, 2016.

(51) Int. Cl.
| | | |
|---|---|---|
| *B65G 43/10* | (2006.01) | |
| *B65G 43/08* | (2006.01) | |
| *B65G 47/22* | (2006.01) | |
| *B65G 65/00* | (2006.01) | |

(52) U.S. Cl.
CPC ............ *B65G 43/10* (2013.01); *B65G 43/08* (2013.01); *B65G 47/22* (2013.01); *B65G 65/005* (2013.01); *B65G 2203/0233* (2013.01); *B65G 2203/046* (2013.01); *B65G 2811/0605* (2013.01); *B65G 2811/0673* (2013.01); *G05B 2219/31286* (2013.01)

(58) Field of Classification Search
CPC .................... B65G 43/10; B65G 43/08; B65G 2811/0673; B65G 2203/0233; B65G 1/13; B65G 1/1371; B65G 1/1373; G05B 2219/31286; G05B 19/4189

USPC ..... 198/341.08, 341.09, 349.6, 349.7, 349.8, 198/890, 890.01, 370.01, 617; 700/230

See application file for complete search history.

(56) References Cited

U.S. PATENT DOCUMENTS

| | | | |
|---|---|---|---|
| 3,071,252 A | 1/1963 | Bosch et al. | |
| 3,071,262 A | 1/1963 | Bosch et al. | |
| 3,306,420 A * | 2/1967 | Norbert Nicolaus | .. B65G 43/00 198/340 |
| 6,853,876 B2 * | 2/2005 | Wehrung | ........... G05B 19/4182 700/230 |

(Continued)

OTHER PUBLICATIONS

International Search Report for PCT/US17/64006 dated Feb. 16, 2018.

*Primary Examiner* — Joseph A Dillon, Jr.
(74) *Attorney, Agent, or Firm* — Workman Nydegger

(57) ABSTRACT

Embodiments are directed to conveyor systems and methods for controlling induction of items within the conveyor systems. In one scenario, a conveyor control system implements a hardware sensor in a conveyor system to generate sensor readings regarding an operational status of a first zone in an operational environment, where the first zone is an area where orders are fulfilled. The conveyor control system receives sensor data from the hardware sensor of the conveyor system. The sensor data includes feedback information for controlling the conveyor system. The conveyor control system then evaluates the received sensor data to determine which conveyable items are currently in the first zone and, based on the evaluation, induces the conveyable items onto the conveyor for the first zone.

10 Claims, 12 Drawing Sheets

(56) References Cited

U.S. PATENT DOCUMENTS

| | | | |
|---|---|---|---|
| 7,863,536 B2 * | 1/2011 | Cerutti | B07C 3/02 |
| | | | 198/370.03 |
| 9,422,116 B1 * | 8/2016 | Hase | B65G 43/10 |
| 9,738,455 B2 * | 8/2017 | Neiser | B65G 43/08 |
| 10,106,330 B2 * | 10/2018 | Maines | B65G 43/00 |
| 10,479,612 B1 * | 11/2019 | Gopalakrishnan | B07C 5/00 |
| 2005/0241910 A1 * | 11/2005 | Affaticati | B07C 5/36 |
| | | | 198/357 |
| 2009/0145723 A1 * | 6/2009 | Ogawa | B65G 43/08 |
| | | | 198/460.1 |
| 2010/0030373 A1 * | 2/2010 | Lee | B65B 35/44 |
| | | | 700/223 |
| 2011/0295413 A1 | 12/2011 | Hara et al. | |
| 2013/0000252 A1 | 1/2013 | Pettersson et al. | |
| 2014/0364998 A1 | 12/2014 | Neiser et al. | |
| 2016/0176562 A1 | 6/2016 | Pettersson et al. | |
| 2016/0221762 A1 * | 8/2016 | Schroader | B65G 43/08 |
| 2016/0321481 A1 | 11/2016 | Bottazzi et al. | |
| 2017/0101273 A1 * | 4/2017 | Itoh | B65G 43/08 |
| 2019/0155264 A1 * | 5/2019 | Enssle | G06F 16/2457 |

* cited by examiner

BALANCING LOAD AMONG OPERATIONAL SYSTEM ZONES

CROSS-REFERENCE TO RELATED APPLICATIONS

This application claims priority to and the benefit of U.S. Provisional Patent Application No. 62/428,872, entitled "Balancing Load among Operational System Zones," filed on Dec. 1, 2016, which application is incorporated by reference herein in its entirety.

BACKGROUND

Computing systems have become ubiquitous, ranging from small embedded devices to phones and tablets to PCs and backend servers. Each of these computing systems is designed to process software code. The software allows users to perform functions, interacting with the hardware provided by the computing system. In some cases, these computing systems may be equipped with communication components such as wireless radios or wired network controllers. These communication components allow the computing systems to transmit and receive communications from other computing systems, as well as other devices. In some cases, the communication components allow the computing system to receive feedback data from devices or other systems.

BRIEF SUMMARY

Embodiments described herein are directed to conveyor systems and methods for controlling induction of items within the conveyor systems. In one embodiment, a conveyor control system implements a hardware sensor in a conveyor system to generate sensor readings regarding an operational status of a first zone in an operational environment, where the first zone is an area where orders are fulfilled. The conveyor control system receives sensor data from the hardware sensor of the conveyor system. The sensor data includes feedback information for controlling the conveyor system. The conveyor control system then evaluates the received sensor data to determine which conveyable items are currently in the first zone and, based on the evaluation, induces the conveyable items onto the conveyor for the first zone.

In another embodiment, a conveyor system is provided which controls the flow of conveyable items on conveyors of the conveyor system. The conveyor system also includes a hardware sensor configured to make sensor readings regarding an operational status of a first zone in the conveyor system. The conveyor system further includes an induction system that determines the order in which conveyable items are produced and provided to the conveyor system by performing the following: receiving sensor data from the hardware sensor of the conveyor system that includes feedback for controlling the induction system, evaluating the received sensor data to determine which conveyable items are currently in at least the first zone and, based on the evaluation, inducing conveyable items onto a specified conveyor of the conveyor system in the first zone.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description, or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
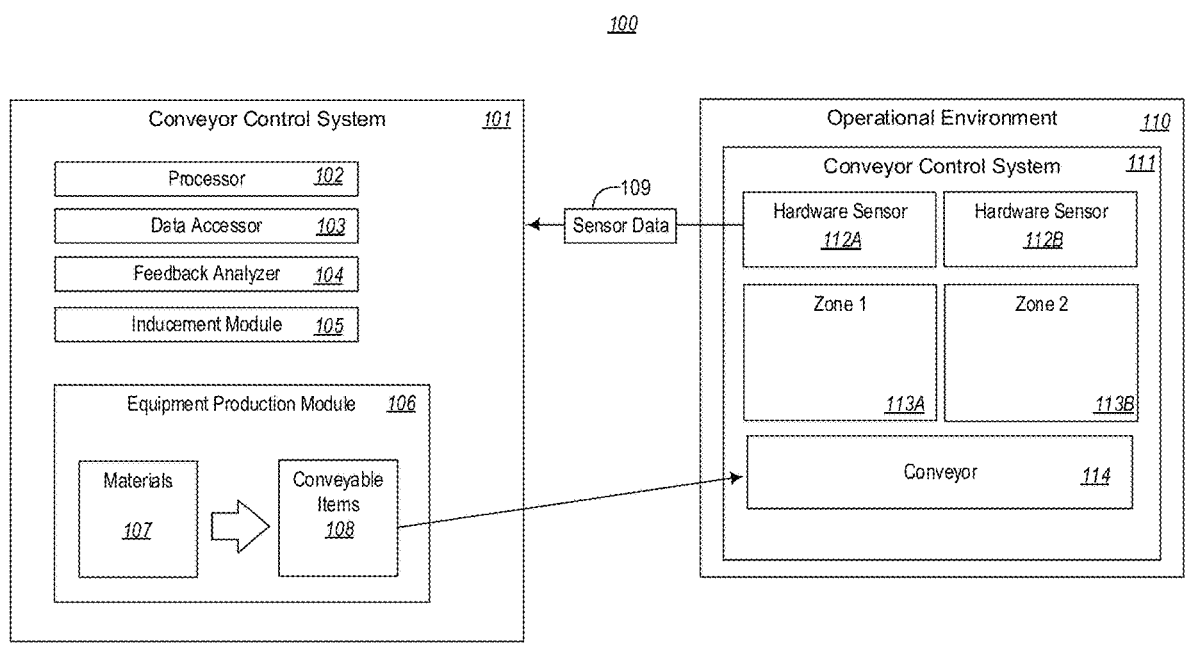
FIG. 1 illustrates a computer architecture in which embodiments described herein may operate including controlling the flow of items within a conveyor system.

Embodiments described herein are directed to conveyor systems and methods for controlling induction of items within the conveyor systems. In one embodiment, a conveyor control system implements a hardware sensor in a conveyor system to generate sensor readings regarding an operational status of a first zone in an operational environment, where the first zone is an area where orders are fulfilled. The conveyor control system receives sensor data from the hardware sensor of the conveyor system. The sensor data includes feedback information for controlling the conveyor system. The conveyor control system then evaluates the received sensor data to determine which conveyable items are currently in at least the first zone and, based on the evaluation, induces the conveyable items onto the conveyor for the first zone.

In another embodiment, a conveyor system is provided which controls the flow of conveyable items on conveyors of the conveyor system. The conveyor system also includes a hardware sensor configured to make sensor readings regarding an operational status of a first zone in the conveyor system. The conveyor system further includes an induction system that determines the order in which conveyable items are produced and provided to the conveyor system by performing the following: receiving sensor data from the hardware sensor of the conveyor system that includes feedback for controlling the induction system, evaluating the received sensor data to determine which conveyable items are currently in the first zone and, based on the evaluation, inducing conveyable items onto a specified conveyor of the conveyor system in the first zone.

The following discussion refers to a number of methods and method acts that may be performed by one or more embodiments of the subject matter disclosed herein. It should be noted, that although the method acts may be discussed in a certain order or illustrated in a flow chart as occurring in a particular order, no particular ordering is necessarily required unless specifically stated, or required because an act is dependent on another act being completed prior to the act being performed.

Embodiments described herein may implement various types of computing systems. These computing systems are now increasingly taking a wide variety of forms. Computing systems may, for example, be mobile phones, electronic appliances, laptop computers, tablet computers, wearable devices, desktop computers, mainframes, and the like. As used herein, the term "computing system" includes any device, system, or combination thereof that includes at least one processor, and a physical and tangible computer-readable memory capable of having thereon computer-executable instructions that are executable by the processor. A computing system may be distributed over a network environment and may include multiple constituent computing systems.

A computing system typically includes at least one processing unit and memory. The memory may be physical system memory, which may be volatile, non-volatile, or some combination of the two. The term "memory" may also be used herein to refer to non-volatile mass storage such as physical storage media or physical storage devices. If the computing system is distributed, the processing, memory and/or storage capability may be distributed as well.

As used herein, the term "executable module" or "executable component" can refer to software objects, routines, methods, or similar computer-executable instructions that may be executed on the computing system. The different components, modules, engines, and services described herein may be implemented as objects or processes that execute on the computing system (e.g., as separate threads).

As described herein, a computing system may also contain communication channels that allow the computing system to communicate with other message processors over a wired or wireless network. Such communication channels may include hardware-based receivers, transmitters or transceivers, which are configured to receive data, transmit data or perform both.

Embodiments described herein also include physical computer-readable media for carrying or storing computer-executable instructions and/or data structures. Such computer-readable media can be any available physical media that can be accessed by a general-purpose or special-purpose computing system.

Computer storage media are physical hardware storage media that store computer-executable instructions and/or data structures. Physical hardware storage media include computer hardware, such as RAM, ROM, EEPROM, solid state drives ("SSDs"), flash memory, phase-change memory ("PCM"), optical disk storage, magnetic disk storage or other magnetic storage devices, or any other hardware storage device(s) which can be used to store program code in the form of computer-executable instructions or data structures, which can be accessed and executed by a general-purpose or special-purpose computing system to implement the disclosed functionality of the embodiments described herein. The data structures may include primitive types (e.g. character, double, floating-point), composite types (e.g. array, record, union, etc.), abstract data types (e.g. container, list, set, stack, tree, etc.), hashes, graphs or any other types of data structures.

As used herein, computer-executable instructions comprise instructions and data which, when executed at one or more processors, cause a general-purpose computing system, special-purpose computing system, or special-purpose processing device to perform a certain function or group of functions. Computer-executable instructions may be, for example, binaries, intermediate format instructions such as assembly language, or even source code.

Those skilled in the art will appreciate that the principles described herein may be practiced in network computing environments with many types of computing system configurations, including, personal computers, desktop computers, laptop computers, message processors, hand-held devices, multi-processor systems, microprocessor-based or programmable consumer electronics, network PCs, mini-computers, mainframe computers, mobile telephones, PDAs, tablets, pagers, routers, switches, and the like. The embodiments herein may also be practiced in distributed system environments where local and remote computing systems, which are linked (either by hardwired data links, wireless data links, or by a combination of hardwired and wireless data links) through a network, both perform tasks. As such, in a distributed system environment, a computing system may include a plurality of constituent computing systems. In a distributed system environment, program modules may be located in both local and remote memory storage devices.

Those skilled in the art will also appreciate that the embodiments herein may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

Referring to the figures, FIG. 1 illustrates a computer architecture 100 in which at least one embodiment described herein may be employed. The computer architecture 100 includes a computer system 101. The computer system 101 includes at least one processor 102 and some system memory. The computer system 101 may be any type of local or distributed computer system, including a cloud computer system. The computer system 101 includes modules for performing a variety of different functions. For instance, a communications module may be configured to communicate with other computer systems. The communications module may include any wired or wireless communication means that can receive and/or transmit data to or from other computer systems. The communications module may be configured to interact with databases, mobile computing devices (such as mobile phones or tablets), embedded or other types of computer systems.

The computer system 101 further includes a data accessor 103. The data accessor 103 may be configured to access data from a conveyor system in an operational environment 110. The operational environment 110 may be any type of warehouse, fulfillment center, distribution center, factory or other environment in which conveyors are used. The data received and accessed by the data accessor 103 is sensor data 109 from one or more hardware sensors in the conveyor system 111.

For instance, a conveyor system 111 may have different zones (e.g. zone 1 (113A) and zone 2 (113B)). These zones may be areas or positions where operational workers place items in containers for shipment, for example. Each zone may have a hardware sensor (e.g. 112A and 112B) that determines when a container or other conveyable item is within that zone. Thus, if conveyor 114 loops through multiple zones including zones 1 and 2, the hardware sensors 112A and 112B would indicate whether other conveyable items were currently in those zones. Depending on which types of sensors are being used, the computer system 101 may identify exactly which items are in each zone. For instance, a bar code reader may identify each item uniquely, and provide an indication of its current location.

In other embodiments, different types of hardware sensors may be used. For example, hardware sensors 112A and 112B may be placed throughout the operational environment 110, including on the conveyor 114 and in the various zones (e.g. 113A, 113B or others). The hardware sensors may be programmed to relay sensor data 109 pertaining to the current position of packable items or equipment. Furthermore, the sensor data 109 may relate to the current trajectory of the items or equipment being moved on the conveyor, or physical characteristics of the items or equipment, etc. These characteristics or locations or trajectories may be measured by visible or invisible light sensors, weight sensors, pressure sensors, temperature sensors, cameras, acoustic sensors, inertial sensors or other types of sensors. Indeed, substantially any type of hardware sensor may be used in the operational environment 110.

Some sensors, such as piezoelectric sensors, may be placed at certain locations within the operational environment 110, for example, to measure changes in pressure, acceleration, force, strain or temperature. These sensor measurements may be used to identify where a piece of equipment currently is (as evidenced by changes in pressure or weight at a certain point on the conveyor), what trajectory that piece of equipment is following, what the equipment currently looks like or what is currently in the equipment (using side-mounted or top-mounted cameras), which packable items are currently located in each zone, which workers are currently located in a given zone (e.g. using weight or infrared sensors capable of detecting body heat), or any number of other type of feedback sensor data 118 that would be useful in determining whether to produce and/or release a given piece of equipment.

Hardware radios including Bluetooth radios, radio-frequency identification (RFID), WiFi, Cellular, global positioning system (GPS) or other radios may be used to communicate with radios or transceivers embedded in the pieces of equipment and/or within the conveyable items 108. The radios may use signals from the embedded radios to determine current location, current trajectory, current contents, or other information about the equipment or its contents. These hardware radios may also be in communication with mobile electronic devices used by workers or used at workstations within the operational environment. Internet of Things (TOT) devices may communicate using such radios, and may be programmed to communicate information about the equipment and conveyable items to a central server and/or the conveyor control system 101. The TOT devices may also communicate with the various hardware sensors. Thus, the conveyor control system may receive a variety of inputs from hardware devices, sensors and radios to control production of equipment and to further control where the equipment is going within the operational environment 110.

Sensor data 109 is sent to computer system 101 on a continual basis. In some cases, it should be noted, the computer system 101 may be part of operational environment and may be integrated into the conveyor system 111. In other cases, the computer system 101 is separate from the conveyor system 111, and receives the sensor data 109 via a wired or wireless transmission to the communications module of the computer system. Once the sensor data is received at the computer system 101, the feedback analyzer 104 analyzes the data sent as feedback to the computer system. The sensor data may indicate how the conveyor system is currently operating, whether the conveyor system is operating within normal parameters, where conveyable items are located on the conveyor 114, etc. This data may be used as feedback to control how the conveyor system 111 is operating.

For example, the inducement module 105 may control when conveyable items 108 are induced or provided to the conveyor 114. The equipment production machine 106 may be configured to produce conveyable items such as boxes, and provide those items to the conveyor system 111. The equipment production machine 106 may take pre-manufactured or raw materials 107 and generate the boxes or other conveyable items. The equipment production machine 106 may be configured such that it produces these conveyable item 108 and induces them into the conveyor system 111 at specified times to reduce bottlenecks and traffic jams within the conveyor system.

Figure 2:
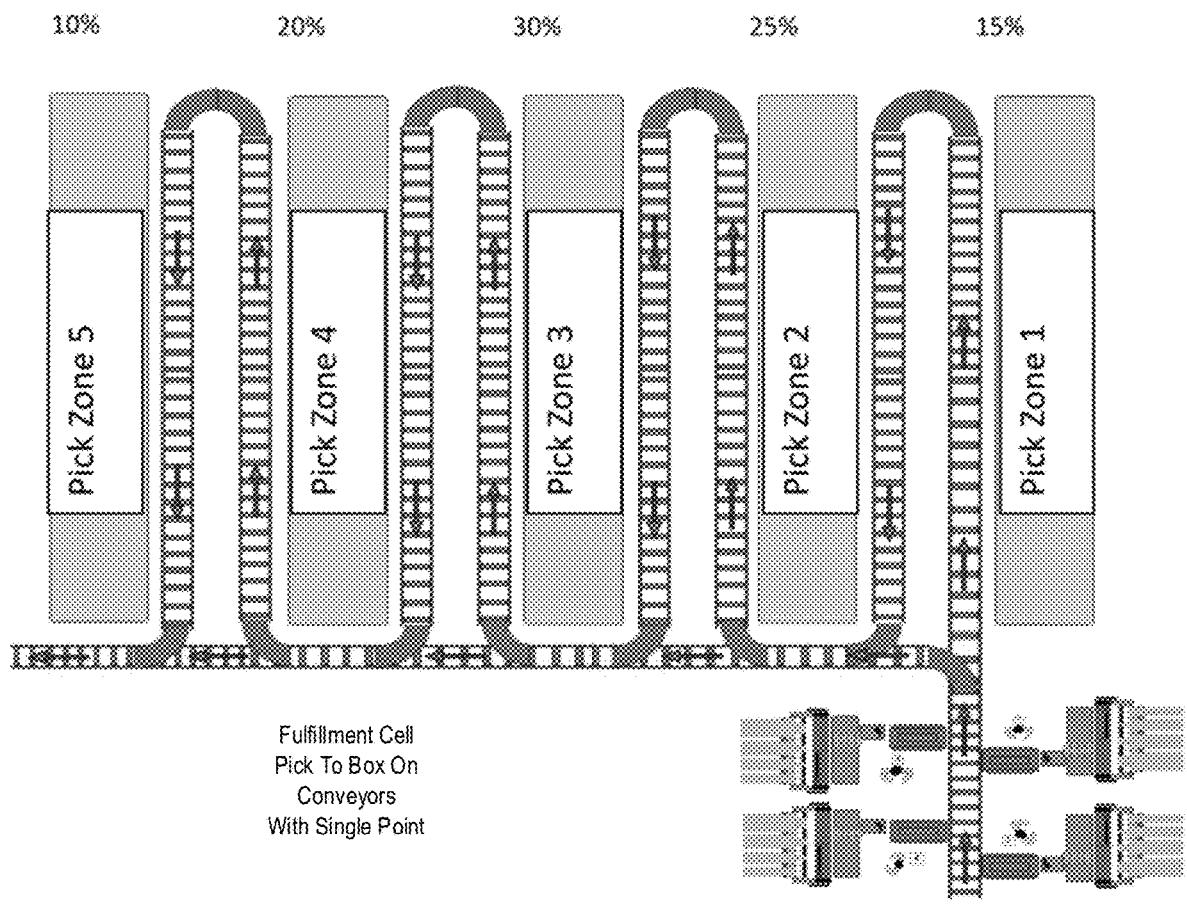
FIG. 2 illustrates an embodiment of a fulfillment center with multiple loading zones.

For instance, as shown in FIG. 2, a fulfillment center 200 is shown. The fulfillment center 200 includes a conveyor 201 that snakes through various pick zones 1-5 (i.e. 202A-202E). Mechanical arms on the conveyor system 111 from FIG. 1 can be used to guide boxes to different zones once they are produced. However, if there are too many boxes in any one zone, backups may occur which reduces productivity. For example, if each zone includes shelves and bins full of packable items that are used to fulfill customer orders, each zone may be capable of filling a certain number of orders per minute or per hour. Moreover, each zone may have different goods that are to be placed into the boxes to fulfill the orders. Accordingly, boxes may be generated at the induction area 203 using one or more of the equipment production machines 204. The boxes may be generated in a manner that maximizes the productivity of the workers in the various zones, and minimizes traffic jams within the zones.

Indeed, in some fulfillment/distribution centers, customer orders for goods are packed by using conveyor systems that transport empty boxes to pick zones where the products are "picked" or placed into the boxes to fulfill the orders. Each pick zone is able to handle a certain amount of load before becoming backed up. The amount of load depends on the size of the pick zone, the number of workers operating the pick zone, the number of packable items at the pick zone, etc. By generating the boxes at specific times, the conveyor control system 101 can regulate flow of boxes among zones. This flow regulation may be referred to as load leveling herein.

In some cases, load leveling may be performed by grouping the boxes into specified groups based on first pick zone (and in some cases additional pick zones for the boxes). Each group holds 1 . . . n pick zones. These groups are assigned a specified ratio that the box induction system maintains. The ratio is based on the estimated number of packable items in each pick zone and the number of pickers in each zone, where the later pick zones have a lower ratio compared to the first because it is likely that a box that has zone 1 as the first pick zone also needs to stop at additional pick zones. Embodiments described herein induce boxes based on current load at each pick zone. This includes the number of boxes within each pick zone, as well as the number of boxes at other zones with stops at the specific pick zone.

In some cases, varying amounts of information is available from the operational environment 110. For instance, if only zone 1 (113A) has a sensor, then production decisions for boxes that are to travel to other zones may be based on extrapolated data. If the first pick zone is currently available according to the sensor data 109, the equipment production machine 106 could produce and distribute boxes to the first pick zone according to a preferred box count for that zone. This preferred box count may be adjusted to take into account multiple stops for boxes if packable items from other pick zones are needed to fulfill the order.

For example, the latter pick zones (i.e. 2-5) may need a lower preferred box count due to the fact that, at least in some cases, it is likely that a box with first pick zone 1 also needs products from pick zone 5. This can be achieved with feedback from the conveyor system 111 including sensor data 109 received from the pick zones so that the conveyor control system 101 knows the number of boxes at each pick zone. Such embodiments can also take into account the pick rate at each pick zone so that the box count at the pick zone is a function of the pick rate at that zone. The equipment production machine 106 would produce the next box based on the pick zone that is furthest from the preferred box count. If all pick zones are at capacity, the equipment production machine 106 would not induce any new boxes onto the conveyor until a pick zone has an available slot.

If all pick zones are available, the equipment production machine 106 may have a numerical limit for the number of boxes that can be sent to each pick zone at any given time. This may include the number of boxes at the pick zone (e.g. 113A) and also the number of boxes in the conveyor system 111 with a specific pick zone as an upcoming destination. In one example, additional boxes for pick zone 5, for example, may be induced if the current boxes with pick zone 5 have as an upcoming destination within the conveyor system multiple stops before reaching pick zone 5. Utilizing feedback from the zones allows the conveyor control system 101 to get the current pick zone location of all the boxes within the conveyor system 111.

Additionally, if the packable items at each pick zone are available to the equipment production machine 106, further optimization may be provided. For example, if box A has one packable item at pick zone 1 and pick zone 2 as an upcoming destination for the box, the equipment production machine 106 might not produce a second box (box B) that needs to go to pick zone 2 due to induction and transportation time to reach pick zone 2 from the induction area (as box A and box B may arrive at pick zone 2 at the same time).

If however, box A has five picks at pick zone 1, the conveyor control system 101 might determine that it can induce box B to pick zone 2 due to the fact that box 1 will take longer at pick zone 1 getting the five items. The conveyor control system 101 may further determine that boxes currently in pick zone 2 would be picked and transported to the next destination before box B reached pick zone 2. Other types of feedback from within the system may be used in addition to or as an alternative to any knowledge about which boxes are being fulfilled and where the boxes need to go for fulfillment. For instance, pick rate at each zone may used to determine when to induce boxes into the system.

Methods used to achieve this load leveling may use the ability to stop and start induction to a specific pick zone before the limit is reached for that pick zone in order to handle unexpected fluctuation in pick rate. These fluctuation could happen due to time needed for replenishing the packable items, breaks for workers, mechanical failure of the conveyor 114, spilled contents, etc. Once the pick zone is reactivated, the equipment production machine 106 would produce more boxes for that pick zone due to the fact that the pick zone would be furthest away from its load limit.

In one embodiment, a conveyor system 111 is provided which includes a conveyor control system 101. The conveyor control system controls the flow of conveyable items on conveyor 114 of the conveyor system. The conveyor system 111 includes one or more hardware sensors 112A/112B which are configured to make sensor readings regarding an operational status of pick zones in the conveyor system (e.g. 113A/113B). The conveyor control system also includes an induction system that determines the order in which conveyable items are produced and provided to the conveyor system. The induction system may include, for example, data accessor 103, feedback analyzer 104, inducement module 105 and/or equipment production machine 106. The data accessor 103 receives and accesses sensor data 109 from the hardware sensor(s) 112A of the conveyor system 111. The sensor data includes feedback regarding the operational status of the conveyor system 111. This feedback may be used to control the induction system, and specifically the order in which conveyable items 108 are produced by the equipment production machine 106.

The feedback analyzer 104 of the induction system evaluates the received sensor data 109 to determine which conveyable items 108 are currently in the first zone and, based on the evaluation, the inducement module 105 induces one or more conveyable items onto a specified conveyor 114 of the conveyor system 111 in the first zone 113A. The conveyable items may be generated in a specified order that avoids traffic jams at different pick zones. The feedback analyzer may take a variety of different factors into account including where packable items are located in the various pick zones, how many workers are available to place packable items into boxes, which pick zones the boxes need to go to be fulfilled, as well as a reading of which zones currently have boxes in them. The inducement module 105 take any or all of these factors (including others that may affect the conveyor system 111) into consideration when determining which boxes to generate and at which time.

It should be understood that the equipment production machine 106 may be configured to produce a variety of different items, although, for simplicity's sake, boxes will be focused on herein. The equipment production machine 106 may thus produce a variety of different boxes. These boxes may be of different shapes and sizes, and may have different load capacities. Each box may be generated from raw materials 107, or from pre-manufactured materials such as cardboard. The equipment production machine 106 may, in some cases, be configured to access cardboard sheets and move, fold, seal and otherwise manipulate the cardboard to create different size boxes. The creation and/or induction of these boxes is on-demand, as orders are received. However, the boxes are not always created immediately as orders are received, as that may lead to traffic jams in the conveyor system 111. Thus, feedback from the conveyor system is provided to the induction system, which takes many different factors into account when determining when to create a box. Controlling when boxes are generated can then level the load across the various pick zones.

For instance, assume an order is received that requires three packable items to be fulfilled. Further, assume that one of these packable items is in zone 1 (113A) and that two of the items are in zone 2 (113B). The feedback analyzer may look at sensor data 109 indicating how many boxes are currently in zones 1 and 2, and may further determine the loading capacity for those zones based on the number of workers currently working in those pick zones. Other factors may also be considered, including urgent orders (overnight mail) or custom orders. Production of boxes to fulfill such orders may be expedited. In most cases, however, the induction system will look at one or more of the factors and determine the best time to create and induce the box onto the conveyor 114 so that the box arrives at zone 1 at an opportune time for fulfillment (and avoiding traffic jams), and then also arrives at zone 2 down the conveyor line at an opportune time. Factors for other zones may also be taken into consideration if more than two zones are used (such as in FIG. 2).

The conveyor system 111 may include control arm that, when actuated, prevent or allow conveyable items onto the conveyor system. The control arms may also be used to route the boxes to different pick zones. The control arms may be used in conjunction with the equipment production machine 106 to control the flow of boxes on the conveyor 114 to the different zones. The boxes may be generated by the equipment production machine 106 at the optimal time, based on current conditions in the conveyor system, and the control arms may be used to hold back boxes when needed before allowing them onto the conveyor 114, and can further be used to route the boxes directly to different zones. For example, if a box in FIG. 2 needs to go directly to zone 5, it may be routed directly to pick zone 5 without traveling through pick zones 1-4.

The induction system may include a local processor, or may have access to distributed processing such as that provided by the cloud. The processor may perform the evaluation of the received sensor data 109 to determine which conveyable items are currently in each zone, and which should be produced based on the currently pending orders and the current number of boxes already in each pick zone. The feedback data from the conveyor system 111 allows the processor to adjust the time of box creation by the equipment production machine 106 in order to level the load across the various pick zones. As mentioned previously, the feedback data from the conveyor system may include a current pick zone location for each of the boxes within the conveyor system, and may also include a current pick rate at each zone (i.e. the rate at which packable items are being taken off shelves and placed into boxes for shipment.

Figure 3A:
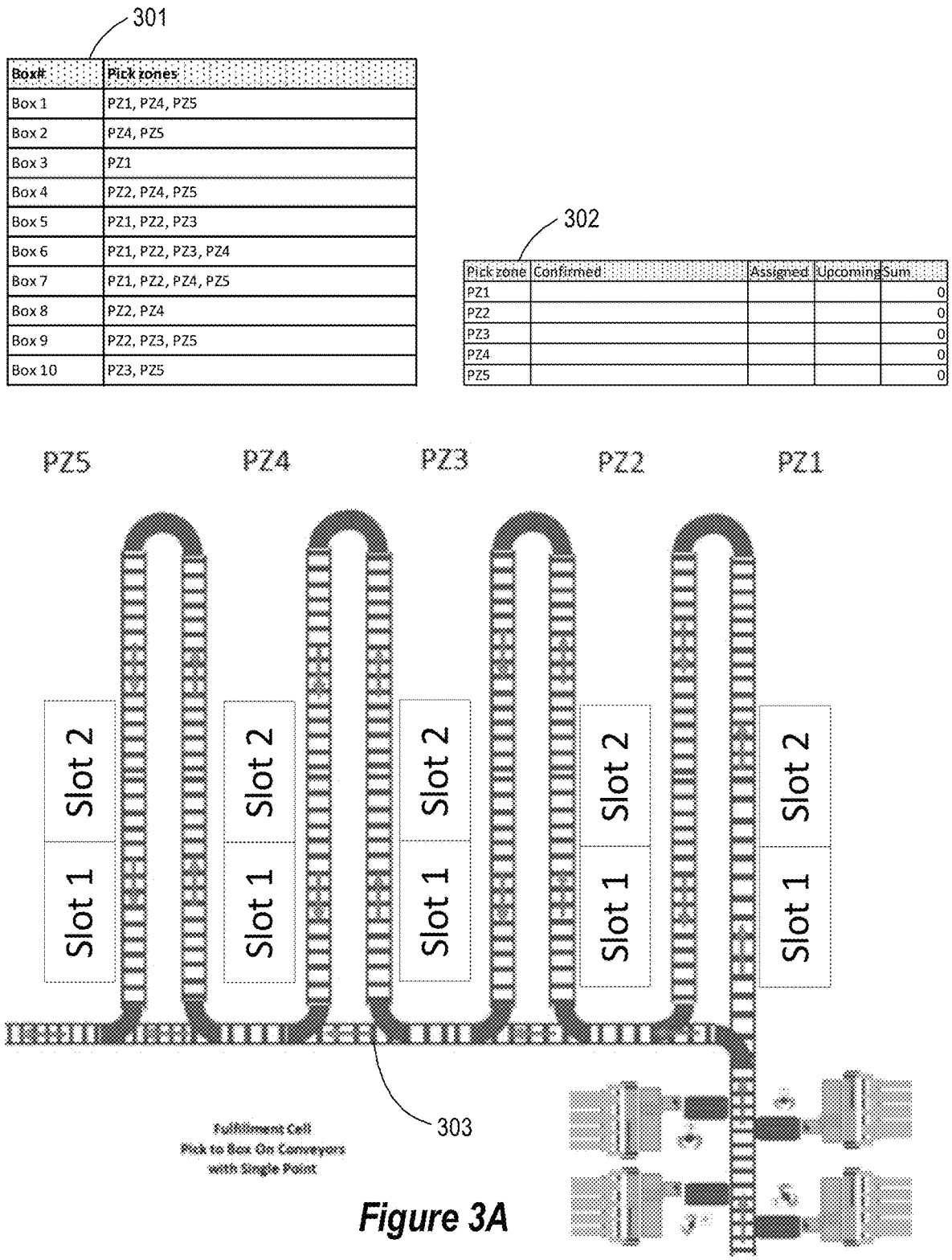
FIGS. 3A-3I illustrate embodiments in which conveyable items are produced in a conveyor system.

Accordingly, the conveyor system 111 may track the location of each box as it travels through the conveyor system. This may be accomplished using hardware sensors at each pick zone, using visual inspections of boxes (e.g. taking images of boxes as they pass by an image creation device such as a camera), by scanning radio frequency identifier (RFID) tags as the boxes pass an RFID reader, or using some other method of identifying boxes as they pass in and out of pick zones. FIGS. 3A-3I illustrate an embodiment in which 10 different boxes are produced and routed through a conveyor system for fulfillment. FIG. 3A shows "Example 1—1st box", indicating that FIG. 3A shows how routing and production timing decisions regarding box 1.

Figure 3B:
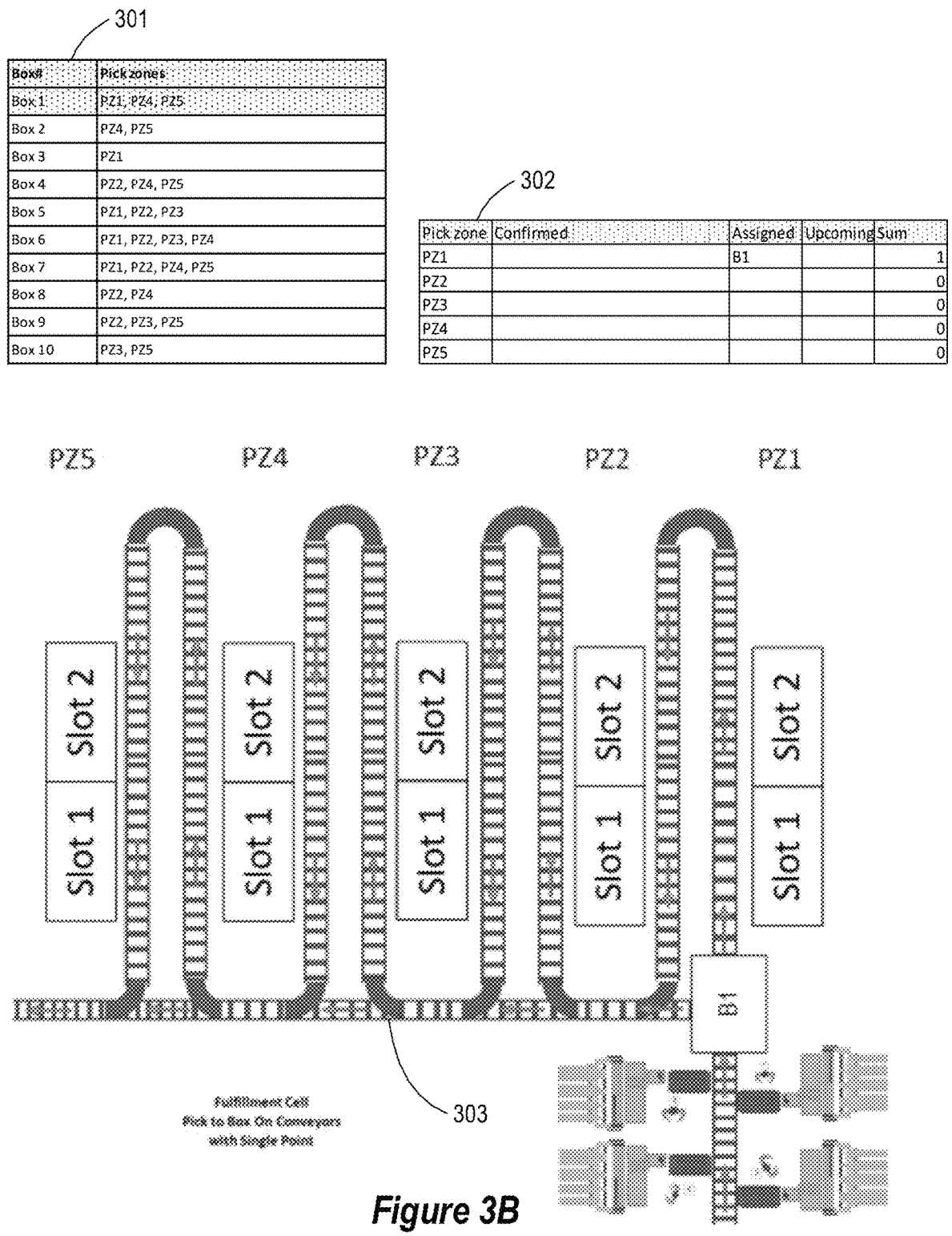
Figure 3C:
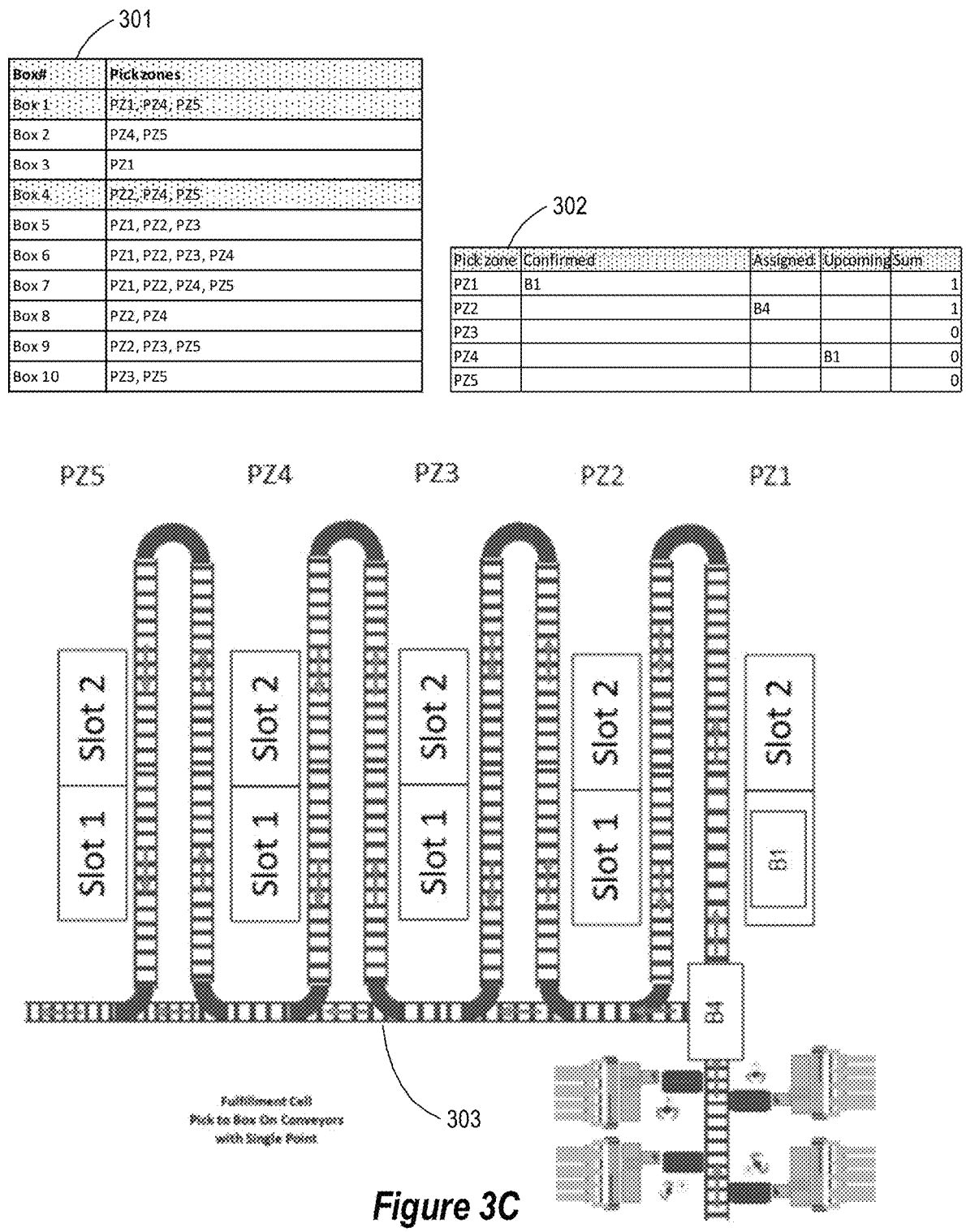
Figure 3D:
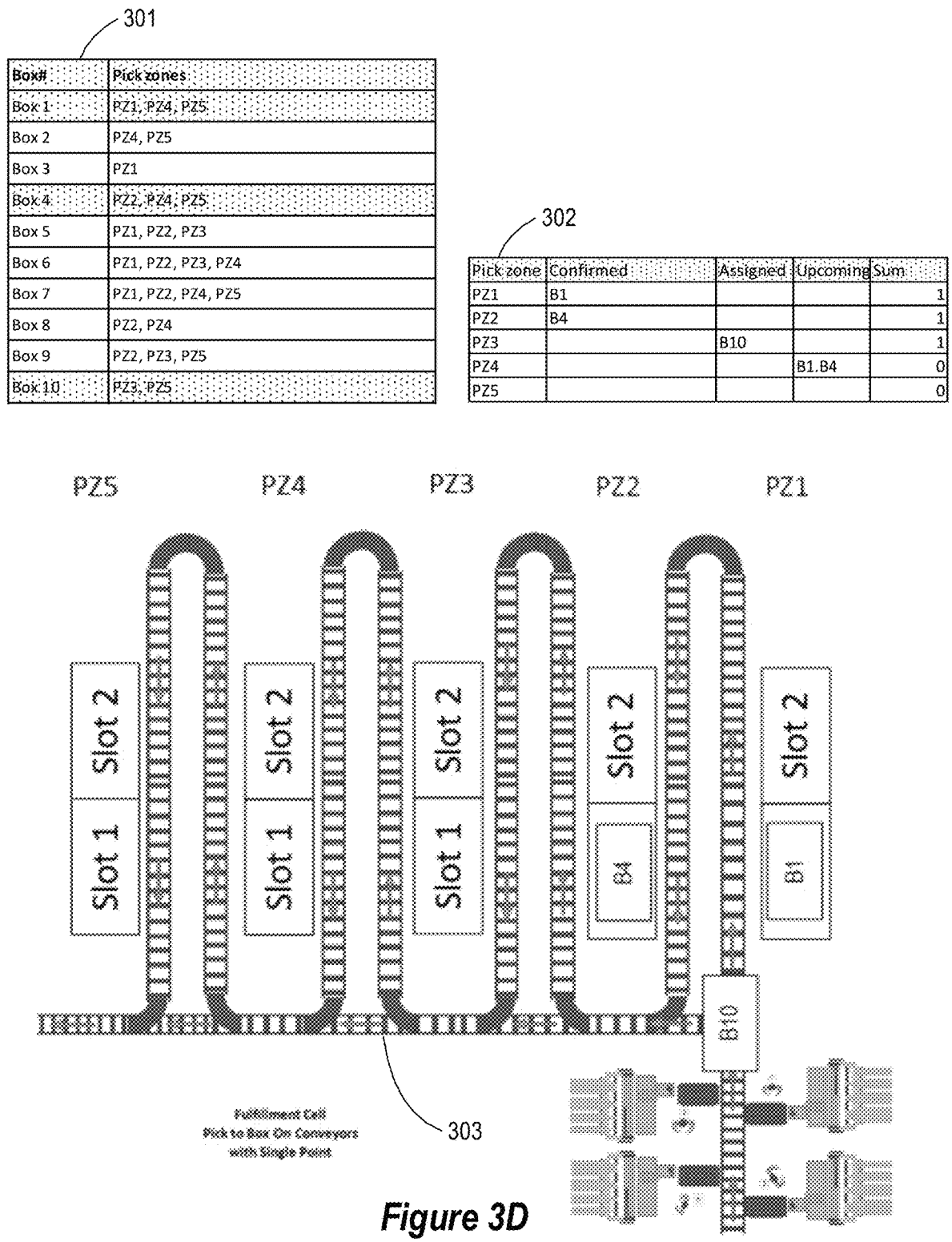
Figure 3E:
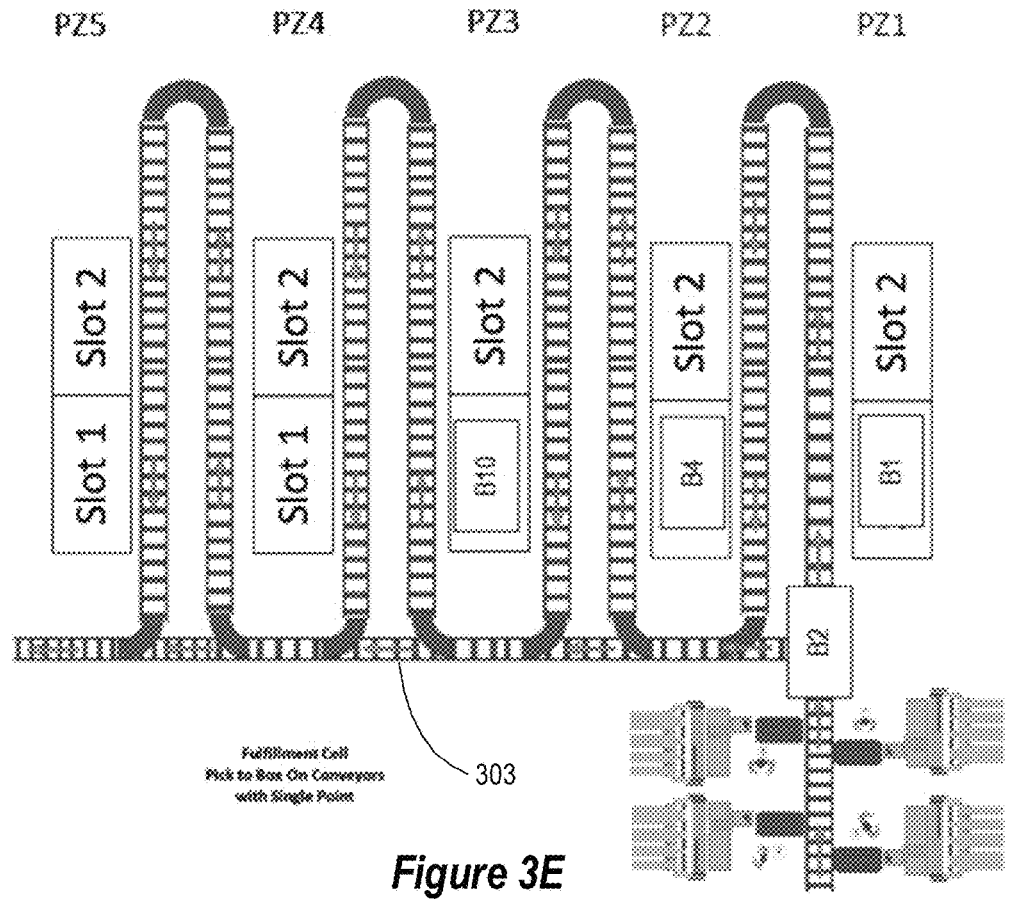
Figure 3F:
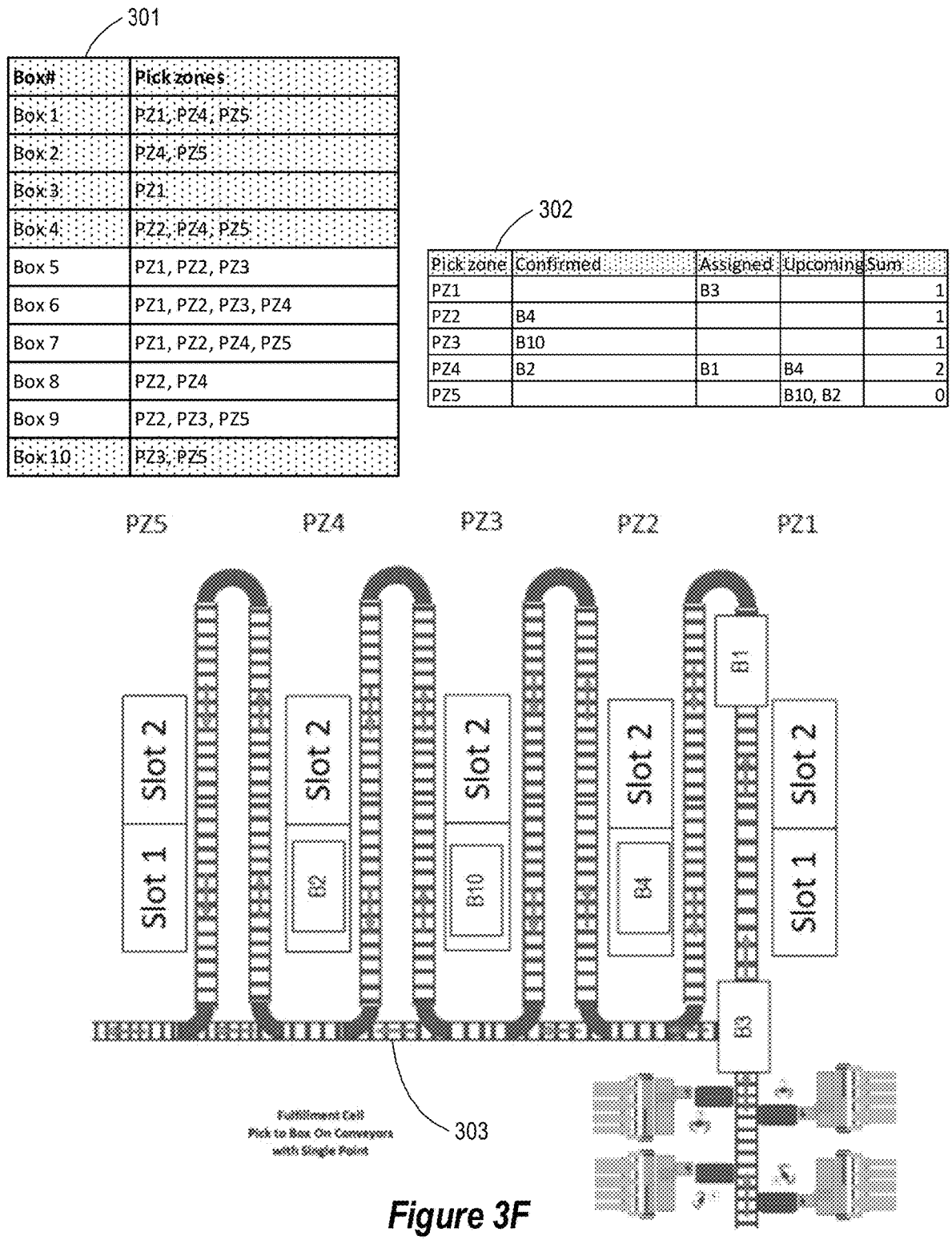
Figure 3G:
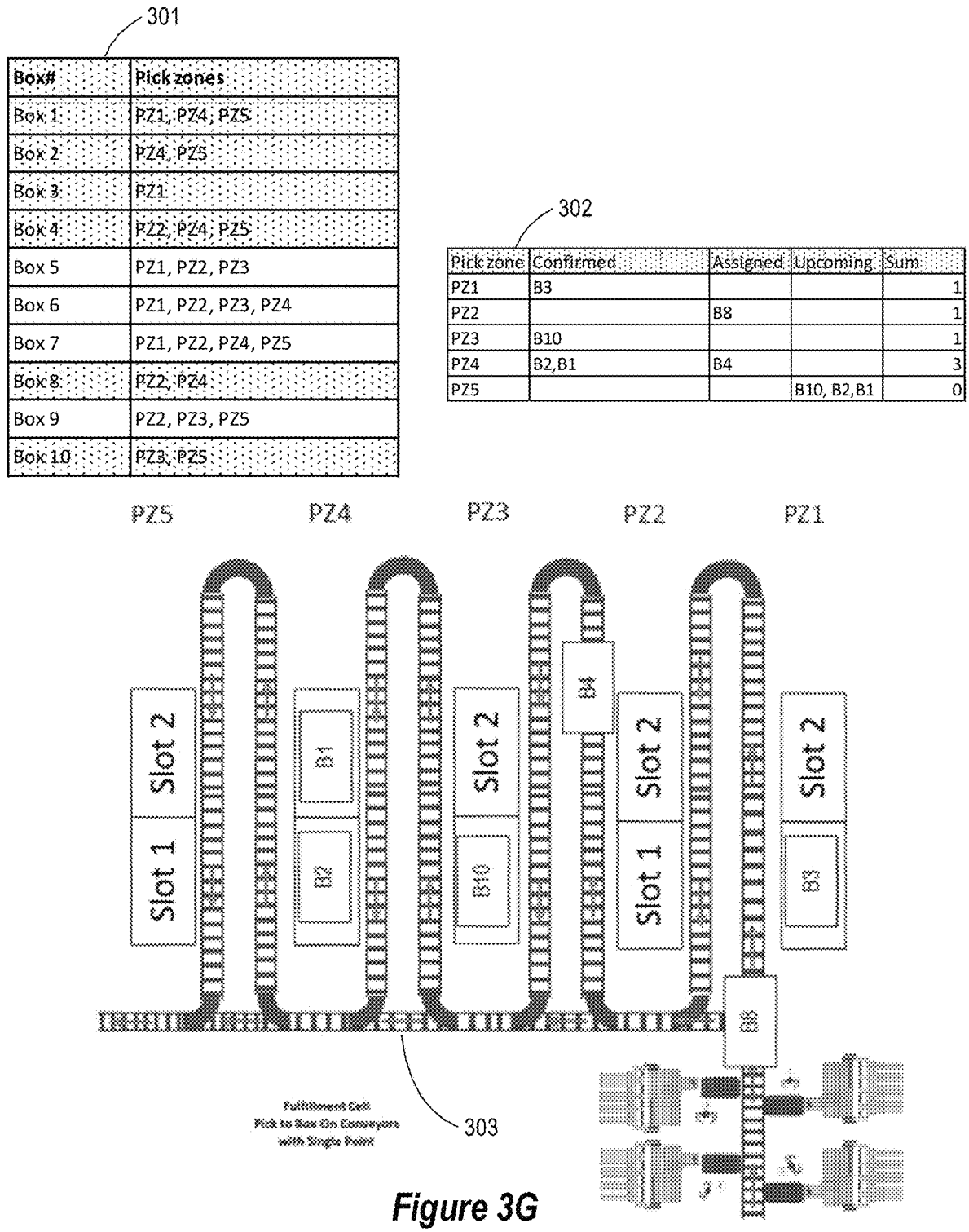
Figure 3H:
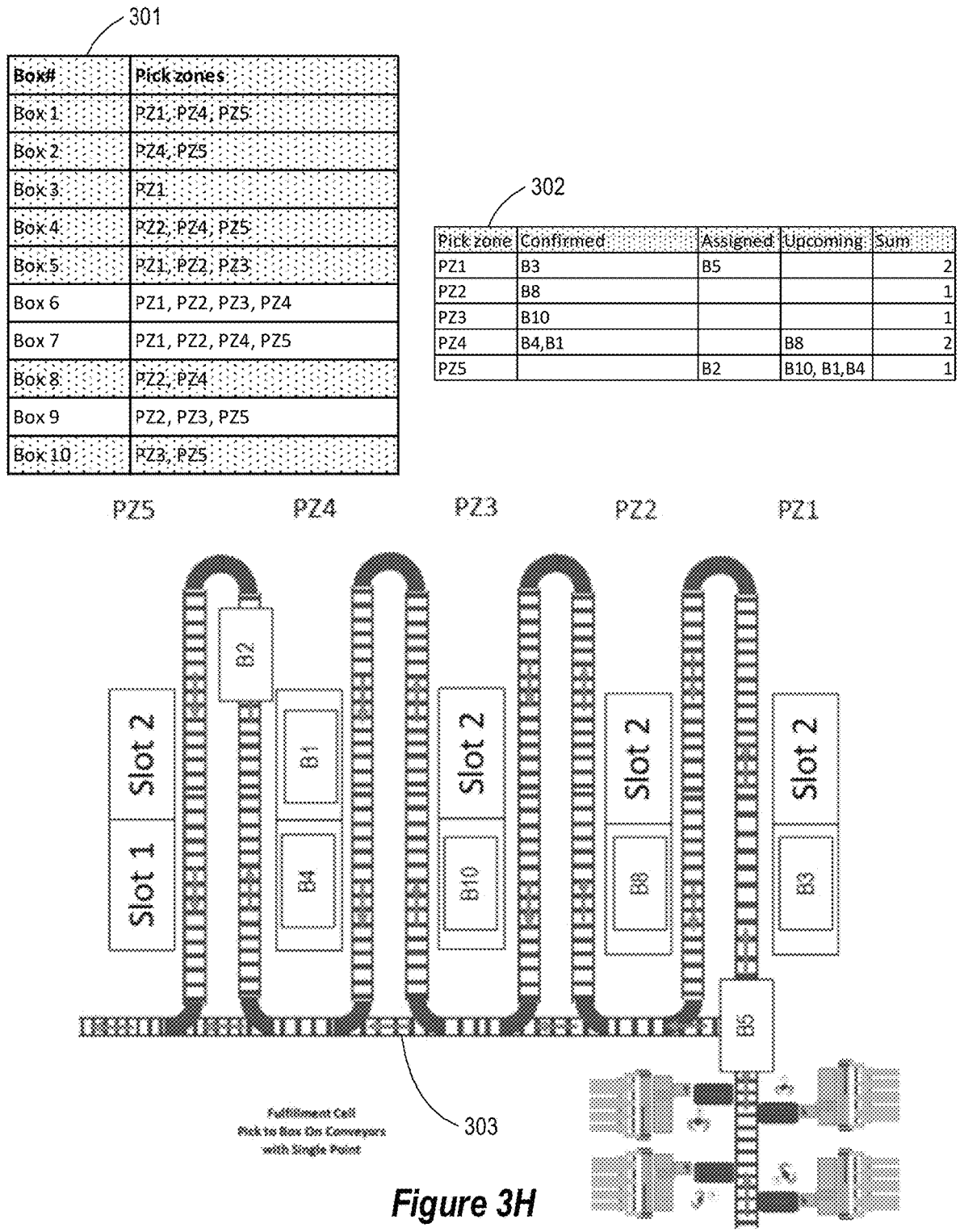
Figure 3L:
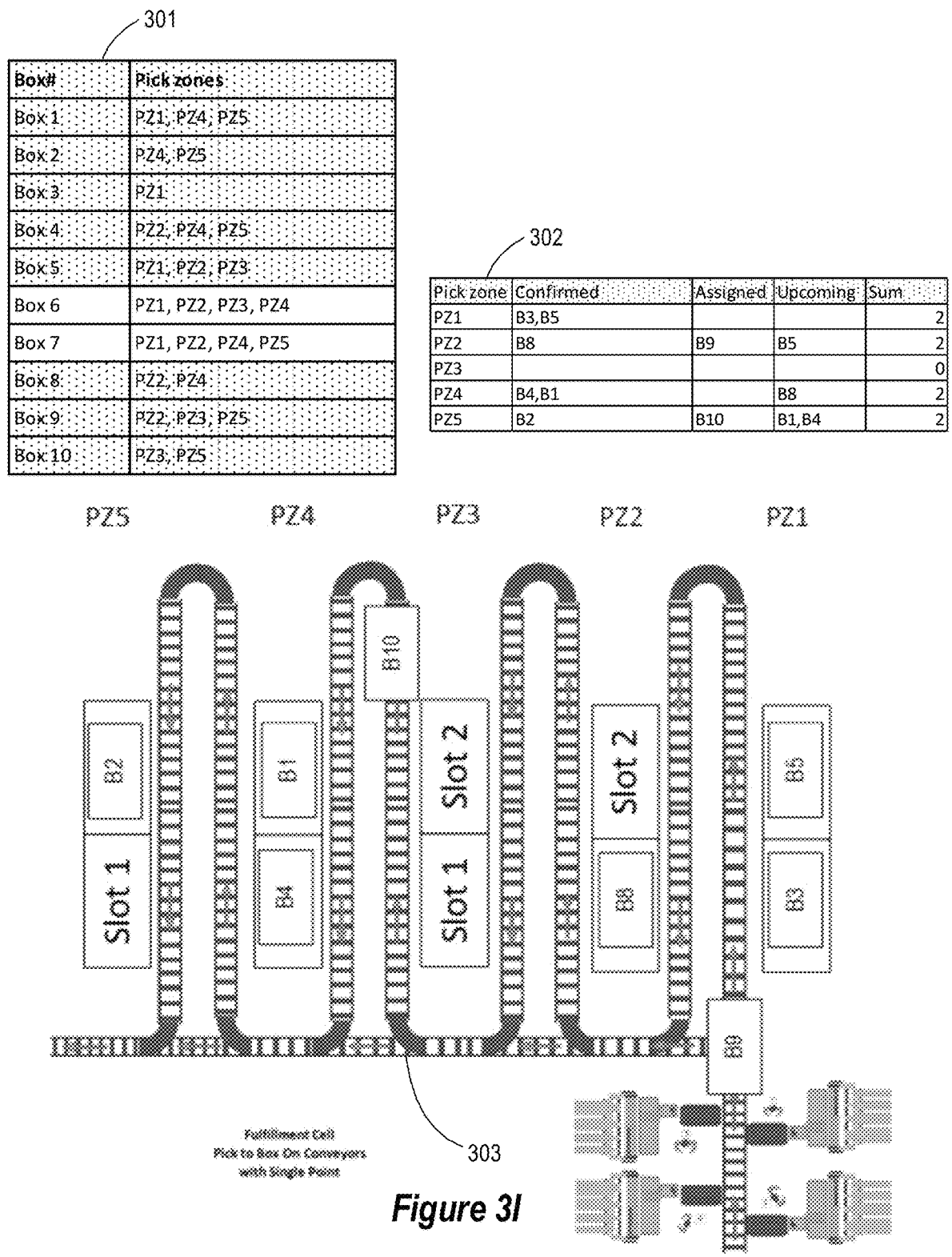

Chart 301 indicates the pick zones that will be needed in order to fulfill the order associated with box 1. Specifically, chart 301 indicates that box 1 will need to travel to pick zones 1, 4 and 5 for fulfillment. FIG. 3B shows that box 1 (B1) is now on the conveyor of the conveyor system 303. Chart 302 indicates that box 1 has been assigned to pick zone 1, and that pick zone 1 has a sum of one boxes in it. FIG. 3C indicates that box B1 is now in slot 1 of pick zone 1, and that box B4 is the next box to be selected for processing and induction into the conveyor system 303. As chart 301 indicates, box B4 is headed to pick zones 2, 4 and 5. As pick zone 2 is currently empty, box B4 is sent their next, ahead of boxes 2 and 3, which are headed to pick zones which will be used in the fulfillment of box 2. As pick zone 2 will not be used in the fulfillment of box B1, box B4 can be sent their immediately.

Chart 302 indicates now that, according to sensors, box B1 is in pick zone 1, that box B4 is assigned to pick zone 2, and that box B1 will be headed next to pick zone 4. This process continues and can be followed through FIGS. 3D-3I. As timing and routing is considered for each box B1-B10, the boxes are generated in an order that will level the load across all of the pick zones. These concepts will be explained further below with regard to method 400 of FIG. 4.

Figure 4:
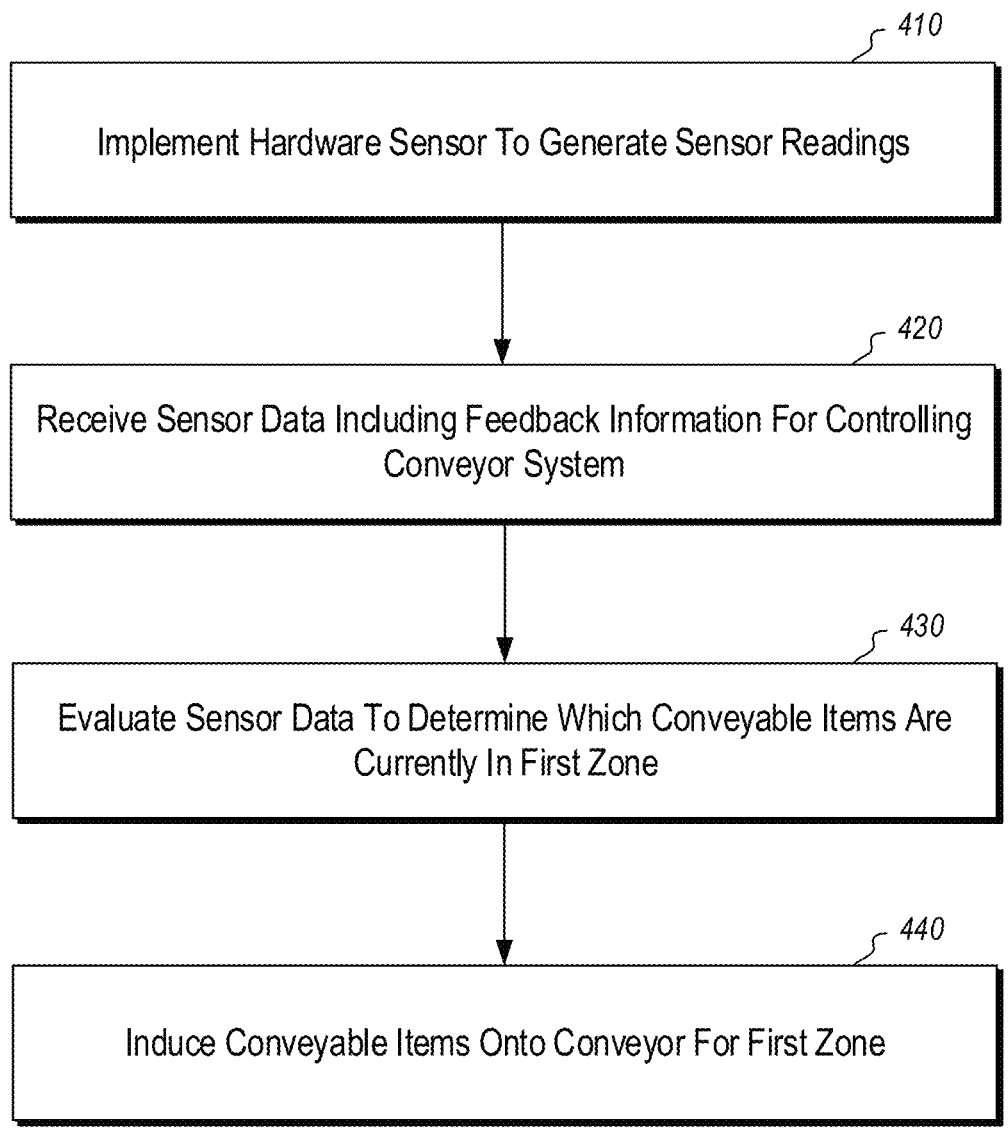
FIG. 4 illustrates a flowchart of an example method for controlling the induction of items within a conveyor system.

In view of the systems and architectures described above, methodologies that may be implemented in accordance with the disclosed subject matter will be better appreciated with reference to the flow chart of FIG. 4. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 4 illustrates a flowchart of a method 400 for controlling induction of items within a conveyor system. The method 400 will now be described with frequent reference to the components and data of environment 100 of FIG. 1.

Method 400 includes implementing at least one hardware sensor in a conveyor system to generate sensor readings regarding an operational status of at least a first zone in an operational environment, the first zone comprising an area where orders are fulfilled (410). For example, hardware sensor 112A may be used in conveyor system 111 to generate sensor data indicating the operational status of equipment and/or personnel within a given pick zone or other area. The operational status data may indicate which conveyors are currently operating, which pick zones have workers in them and how many workers there are, which pick zones are fully stocked on packable items and which are low, which pick zones currently have boxes in them or assigned to them and when those boxes arrived in the pick zone, along with other data including pick rate data which indicates how fast boxes are being filled at a given pick zone.

Method 400 next includes receiving sensor data 109 from the hardware sensor 112A of the conveyor system 111, where the sensor data comprises feedback information for controlling the conveyor system (420). The feedback analyzer 104 looks at the sensor data 109 to determine which conveyable items are currently in the first zone (430). Thus, using the sensor data 109, the feedback analyzer may identify which boxes are in each pick zone of the conveyor system 111. Then, based on the evaluation, the inducement module 105 induces one or more conveyable items onto the conveyor for the first zone. (440). The process may be repeated for each pick zone in the conveyor system 111 and/or for each box that is used to fulfill an order.

As indicated above, the operational environment 111 includes multiple pick zones including the first zone 113A and a second zone 113B. Each of the pick zones has its own hardware sensor 112A/112B configured to generate sensor readings regarding the operational status of its respective zone. The operational status may indicate, for example, how many boxes are currently located in a given zone. Thus, sensor data 109 may indicate that zone one has three boxes and zone 2 has one box. This may indicate, based on current production capacity at each zone, that the zone can either take on more boxes or is full and cannot take on any more boxes at the time. If the pick zone can take on more boxes, then incoming orders with packable items located in those zones may fulfilled by creating a box or other packaging material and sending that box to the specified pick zone.

In addition to the number of boxes currently located in each zone, the sensor data 109 may indicate exactly which boxes are in the zone (as each box is generated on-demand for each order), how long it will likely take to fill the box with the respective packable items (based on previous pick rates), and how long it takes to seal and complete boxes that either have everything they need or are to be sent to another pick zone for fulfillment. Other information may also be used in determining which conveyable items are to be induced onto the conveyor for the first zone. For instance, the information may include a number of operational persons at each zone. The number of boxes produced for fulfillment in a given zone may then be limited by the number of workers at each pick zone.

Still further, information used to determine which conveyable items are to be induced may include the physical length of boxes. For instance, each box may have a known physical size with physical dimensions. If, for example, the sum of the length of all boxes in a zone cannot be greater than X number of inches or feet, and that length has already been met by existing boxes already in the zone, no more boxes will be induced to that zone until sufficient box size capacity has been cleared. It should also be noted that, in at least some embodiments, induction determinations may be made without any sensor data. For example, evaluations performed by the system may be carried out prior to receiving sensor data from any hardware sensors. In such cases, the evaluation would be performed based on induction system information specific to each zone. Such information may include a current pick rate at each zone, a number of scheduled picks yet to occur in each zone, and/or a box limit in each zone. Other information may, of course, be used in the absence of sensor data to make the induction determination.

Additionally or alternatively, the information may include a total number of picks needed to fulfill an order associated with the conveyable item. The number of boxes produced for fulfillment in a given zone may thus be limited by the total number of picks that need to occur in the zone to fulfill that part of the order. The number of picks is roughly equivalent to or the same as the number of packable items that are located in that pick zone. If however, an order requested a large number of the same product, the number of picks would go up even though the picks were not for different products. Still further, the information used to determine which boxes to produce and when to produce them may include sensor data from a zone that is subsequent in position to the first zone. Thus, the system may look at upcoming pick zone ahead, or the next two zones ahead, or the next three and so on in order to determine when to produce the boxes (as generally shown in FIGS. 3A-3I).

Hardware sensors may be provided in each pick zone to provide information on the current status of each zone. The feedback from the hardware sensors, in combination with data indicating which boxes have been produced and when those boxes were produced, provides a current location of each conveyable item in the conveyor system. In some embodiments, the feedback analyzer may be configured to weigh the current load at each pick zone versus the current pick rate at each zone. If the load is high and the pick rate is high, it may be ok to send another box to that zone. Whereas if the load is high at a given zone, and the pick rate is low, it is likely not ok to send another box to that zone. Thus, these factors may be weighed against each other and against other factors to determine the optimal time to produce a box and provide it to the conveyor system 111.

The conveyor control system 101 may further be configured to generate an organizational database structure that stores the received sensor data 109. The organizational database structure includes information indicating which packable items are to be loaded into a given box to fulfill an order. The data accessor 103 may then access that organizational database structure to identify operational environment factors that affect how the flow of items is controlled within the conveyor control system 101. Thus, the organizational database structure may be designed to include those portions of data that are needed to properly evaluate which boxes to produce and when to produce them. Any of the factors described above may be included in the organizational database structure. A unique organizational data structure may be generated for each pick zone, for each box, for each equipment production machine 106 or a single organizational database structure may be generated that includes information for all of the equipment and zones of the operational environment 110.

In one embodiment, a method implemented at a conveyor control system is provided. The method includes various steps for controlling induction into and/or flow of items within the conveyor control system. Specifically, the method includes accessing sensor data received from a hardware sensor in a conveyor system. The sensor data provides information regarding the operational status of a pick zone in an operational environment. As mentioned above, the pick zone is an area where packaging materials are loaded with packable items. The method concludes by evaluating the accessed sensor data to determine which items of packaging material are currently in the pick zone and, based on the evaluation, producing an item of packaging material and inducing that item of packaging material onto the conveyor for the pick zone.

The evaluation may be configured to access further information indicating a current load at a plurality of different zones. Thus, when performing the evaluation, the conveyor control system may look at current load values for multiple different pick zones indicating the number of packaging materials that are already in those zones. This current load data from the different zones may be used to determine whether a specified item of packaging material is to be generated and released into the conveyor system. In some cases, the evaluation may additionally access information indicating a number of zones each item of packaging material is to go to complete fulfillment. Thus, if an item of packaging material is to go to three different zones for fulfillment, while another item only needs to go to one pick zone, the box needing only one pick zone may be generated and released first. Still further, the evaluation may take into account the number of workers at each pick zone, each worker's pick rate (i.e. the rate at which the worker places packable items in boxes), or other factors that influence the efficiency of each pick zone.

In one embodiment, if a certain number of pick zones are available, then the conveyor control system may establish a preferred box count at each pick zone. This preferred box count may be adjusted to take into account multiple stops for different boxes. The preferred box count would act as limit to the number of boxes currently in each pick zone. As boxes are fulfilled, new boxes can be introduced to maintain the preferred box count at each pick zone. This number of boxes may include the number of boxes at the pick zone and also the number of boxes in the conveyor system with the specific pick zone as an upcoming destination (i.e. for boxes that need two or more pick zones for fulfillment). For example, additional boxes for a given pick zone may be induced if the current boxes with that pick zone as an upcoming destination have multiple stops before reaching that pick zone.

Additional optimizations may also be provided. For example, if box A has one pick at pick zone 1 and one pick at pick zone 2 as an upcoming destination, the induction system might not induce box B for pick zone 2 due to induction and transportation time to reach pick zone 2 from the induction area. If however, box A has five picks at pick zone 1, the induction system may determine that it can induce box B to pick zone 2 immediately due to the fact that boxes already in pick zone 2 would be fulfilled and transported to the next destination before box A reached pick zone 2. Accordingly, the evaluation may take into account the current positions of boxes, as measured by various hardware sensors, as well as which boxes are in the pick zones, how many picks they need at each zone for fulfillment, and how many pick zones each box needs to travel to for ultimate fulfillment. Thus, a low number of boxes in one pick zone may trigger more boxes flowing to that zone, and a high number of boxes in another pick zone may prevent the flow of boxes to that pick zone for a specified amount of time.

Accordingly, methods, systems and computer program products are provided which control the flow of items within a conveyor system. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

I claim:

1. A method, implemented at a conveyor control system that includes at least one processor, for controlling induction of items within a conveyor system, the method comprising:
implementing a first hardware sensor in a first zone of a conveyor system to generate sensor readings regarding an operational status of at least the first zone in an operational environment, wherein:
the conveyor system carries boxes within and between multiple different zones,
the operational status comprises information relating to the boxes within the first zone, and
at least one other zone selected from the multiple different zones does not comprise hardware sensor;
receiving sensor data from the first hardware sensor of the conveyor system, the sensor data comprising information for controlling the conveyor system;
evaluating the sensor data to determine which conveyable boxes are currently in the first zone;
generate extrapolated data based upon the sensor data, wherein the extrapolated data indicates which boxes are to travel to the at least one other zone; and
based on the evaluation and the extrapolated data, inducing one or more conveyable boxes onto the conveyor system and into the first zone.

2. The method of claim 1, wherein the operational environment comprises a plurality of zones including the first zone and at least a second zone.

3. The method of claim 2, wherein each of the second zone has its own hardware sensor configured to generate sensor readings regarding the operational status of its respective zone.

4. The method of claim 2, wherein the sensor data includes an indication of a number of conveyable items at each zone.

5. The method of claim 1, further comprising evaluating visual inspection data received from a camera determining which conveyable items are to be induced onto the conveyor for the first zone.

6. The method of claim 1, further comprising evaluating radio frequency identifier tags when determining which conveyable items are to be induced onto the conveyor for the first zone.

7. The method of claim 1, further comprising evaluating information from weight sensors when determining which conveyable items are to be induced onto the conveyor for the first zone.

8. The method of claim 1, further comprising evaluating information from pressure sensors when determining which conveyable items are to be induced onto the conveyor for the first zone.

9. The method of claim 1, further comprising evaluating information from acoustic sensors when determining which conveyable items are to be induced onto the conveyor for the first zone.

10. The method of claim 1, wherein the information from the hardware sensor, in combination with information from one or more other hardware sensors in one or more other zones provides a current location of each conveyable item in the conveyor system.

* * * * *